United States Patent [19]

Klüting et al.

[11] 4,130,029

[45] Dec. 19, 1978

[54] DRIVE ARRANGEMENT FOR MOVING A GLASS PANEL OF A WINDOW OF A VEHICLE

[75] Inventors: Bernd Klüting, Radevormwald; Horst Kutschat, Wuppertal-Ronsdorf, both of Fed. Rep. of Germany

[73] Assignee: Keiper KG, Remscheid, Fed. Rep. of Germany

[21] Appl. No.: 762,421

[22] Filed: Jan. 25, 1977

[30] Foreign Application Priority Data

Jan. 30, 1976 [DE] Fed. Rep. of Germany ....... 2603489

[51] Int. Cl.[2] .............................................. F16H 35/00
[52] U.S. Cl. ....................................................... 74/625
[58] Field of Search .................................. 74/625, 626

[56] References Cited

U.S. PATENT DOCUMENTS

| | | | |
|---|---|---|---|
| 2,370,580 | 2/1945 | Pyne et al. | 74/626 |
| 2,665,904 | 1/1954 | Lehmann | 74/625 X |
| 2,718,395 | 9/1955 | Ehrlich | 74/625 |

*Primary Examiner*—Benjamin W. Wyche
*Assistant Examiner*—Frank H. McKenzie, Jr.
*Attorney, Agent, or Firm*—Michael J. Striker

[57] ABSTRACT

A drive arrangement for moving a glass panel of a window of a vehicle has a motor and an input member connectable with the motor means for moving the glass panel. The input member is rotatable in two opposite directions so as to close or to open the glass panel. At the same time, the input member is displaceable between a first position in which it is coupled to a drive shaft of the motor and is rotated by the latter, and a second position in which the input member is uncoupled from the motor so as to be rotated by hand. A lock is provided which is inoperative in the position when the input member is coupled to the motor, and is operative in the position when the input member is uncoupled from the same. When the lock is operative permits rotation of the input member for closing the glass panel, but does not permit the rotation for opening of the latter so that unauthorized opening of the glass panel is prevented. The lock is formed as an overrunning lock provided with a locking element.

16 Claims, 4 Drawing Figures

DRIVE ARRANGEMENT FOR MOVING A GLASS PANEL OF A WINDOW OF A VEHICLE

BACKGROUND OF THE INVENTION

The present invention generally relates to a drive arrangement for moving a glass panel of a window of a vehicle, and particularly of a motor car, which arrangement permits opening and closing the glass panel both by operation of an electric motor and by hand operation. More particularly, the present invention relates to such drive arrangement which comprises moving means for opening and closing the glass panel of the window including an input member, which input member is axially movable between two positions in which it is respectively coupled to and uncoupled from a drive shaft of the electric motor.

Drive arrangements for moving a glass panel of a window of a vehicle have been proposed, comprising moving means which permit displacement of the glass panel to a closed position, even in the case when electric drive means are turned off. These moving means comprise a hollow shaft carrying an input member, such as a gear wheel, which gear wheel can be uncoupled from a worm gear meshing with a motor-driven worm. For uncoupling the above mentioned parts, a pin of a crank handle, supporting a ball serving as coupling means, moves longitudinally in the hollow shaft against a spring operative in the direction towards coupling. This construction possesses the disadvantages that in the position of uncoupling from the motor the locking drive action of a self-locking reduction transmission attached to the same is interrupted, and the glass panel under the action of directly applied force is easy displaceable to the open position.

Drive arrangements for moving a glass panel of a window of a vehicle have been further proposed, in which additional braking means have been provided to eliminate the undesirable opening of the glass panel in the above-mentioned position of uncoupling from the motor drive. However, this construction has the essential disadvantage that the braking means affect the operating efficiency of the motor drive, which is evidently extremely undesirable.

SUMMARY OF THE INVENTION

Accordingly, it is an object of the present invention to overcome the disadvantages of the prior art.

More particularly, it is an object of the present invention to provide an improved arrangement for moving a glass panel of a window of a vehicle which prevents unauthorized, or unintentional opening of the glass panel.

Another object of the present invention is to provide a drive arrangement which permits moving of a glass panel by operation of an electric motor and by hand, in which during operation of the electric motor the glass panel is secured against unauthorized opening by a self-locking transmission attached to the electric motor and during hand operation, that is, in a position of uncoupling from the electric motor, the glass panel is also secured against unauthorized opening by specific locking means.

Still another object of the present invention is to provide a drive arrangement comprising locking means for preventing unauthorized opening of the glass panel in a position of uncoupling from the motor drive, in which the locking means do not affect the operating efficiency of the motor drive and at the same time reliably perform their functions and are of a simple construction.

In keeping with these objects and with others which will become apparent hereafter, one feature of the present invention resides, briefly stated, in that the drive arrangement of the invention has moving means for moving a glass panel comprising an input member rotatable in the respective directions to open and to close the glass panel, and also movable between a first position in which the input member is coupled with a dirve shaft of motor means and is rotated by the latter and a second position in which the input member is uncoupled from the motor means so as to be rotatable by hand operation. Locking means are provided which are inoperative when the input member is in the first position, and operative when the input member is in the second position so as to permit rotation of the input member for closing the glass panel and to prevent rotation thereof in direction of opening of the same. The locking means are preferably formed as an overrunning lock with a locking element. In this construction, when the glass panel is moved by motor drive operation, the input member is coupled with the motor means and the glass panel is secured against unauthorized opening by a self-locking transmission attached to the motor means. When the input member is uncoupled from the motor means and the glass panel can be moved by hand operation to be closed, it is prevented from moving in a direction of unauthorized opening by the action of the overrunning lock of the locking means. Such construction assures reliable securing of the glass panel against unauthorized opening, and at the same time does not affect the operating efficiency of the motor means.

Another feature of the present invention is that the input member is formed as a pinion, mounted on a drive shaft of the motor means movably relative to the same in the axial direction so as to be coupled with and uncoupled from the drive shaft. On the other hand, the pinion is in meshing engagement with a toothed element of the moving means both in the position of coupling to and uncoupling from the drive shaft. For this purpose, the height of the pinion exceeds the height of the toothed element so that the latter is in constant meshing engagement with the former.

Still another feature of the present invention is embodied in means for holding the pinion in a position in which it is coupled with the drive shaft, which means include a spring loaded arm; and a means for uncoupling the pinion from the drive shaft, including a threaded sleeve-shaped element meshing with a thread of the pinion. The thread of the sleeve-shaped element has such direction that a direction of rotation for uncoupling the pinion from the drive shaft corresponds to the direction of rotation for closing the glass panel. This assures a very simple and convenient hand operation of the arrangement for closing the glass panel, since in order to perform the same it is merely necessary to rotate the sleeve-shaped member in the direction of closing until the pinion is uncoupled from the drive shaft of the motor means, and thereafter to continue the rotation in the same direction until the glass panel is closed.

The spring-loaded arm may have a portion adapted to hold the locking element in the inoperative position. Preferably, the locking element is formed as a spring-loaded locking pawl. This locking pawl is held in an inoperative position during coupling of the pinion with the drive shaft of the motor means. This locking pawl is released for engagement with the pinion when the latter is uncoupled from the shaft by rotation of the sleeve-shaped element. The spring-loaded arm may be formed as a leaf spring, in which case it is of an especially simple construction. The sleeve-shaped element may be provided with engaging surfaces adapted to be engaged with a tool for rotating the sleeve-shaped element, preferably with a polygonal wrench supplied with the motor car.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
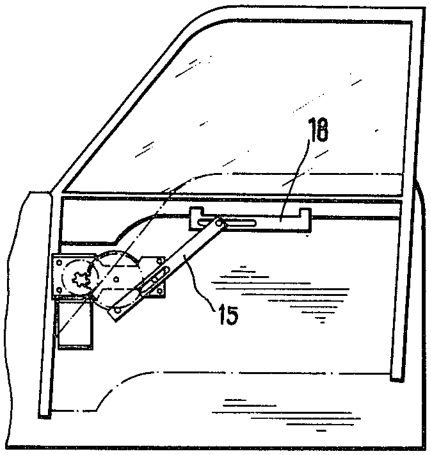
FIG. 1 is a side view, showing a drive arrangement of the present invention mounted on a motor car.
Figure 2:
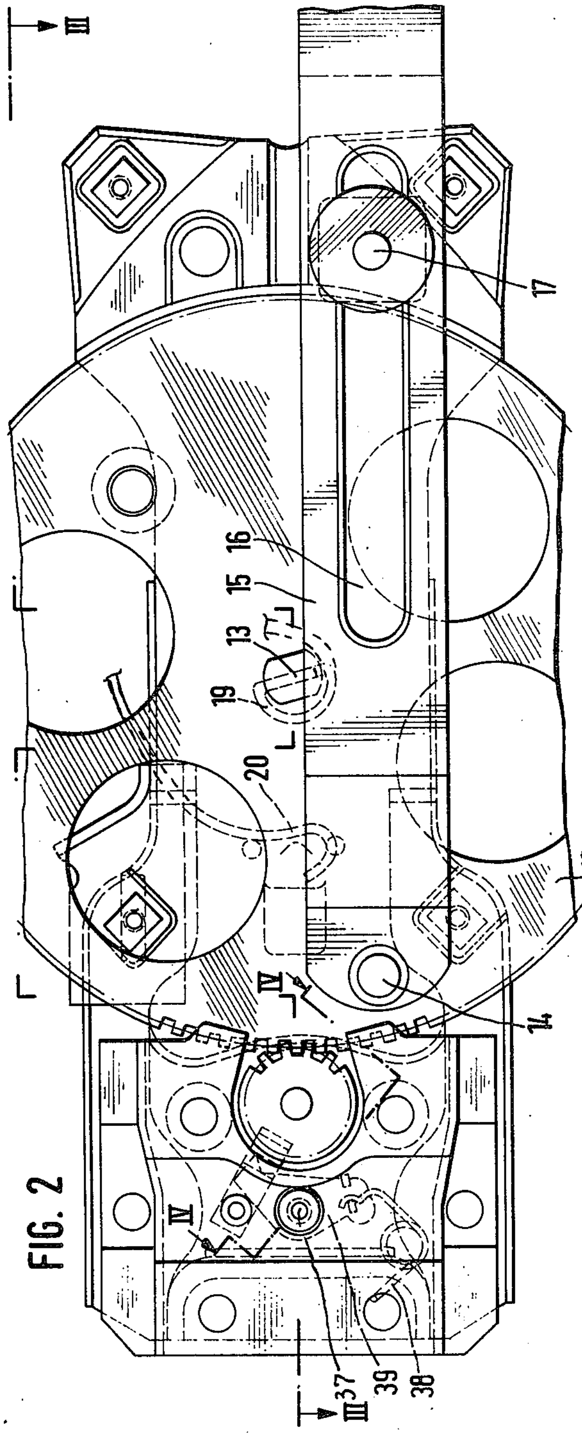
FIG. 2 is an enlarged plan view of a drive arrangement of the invention.
Figure 3:
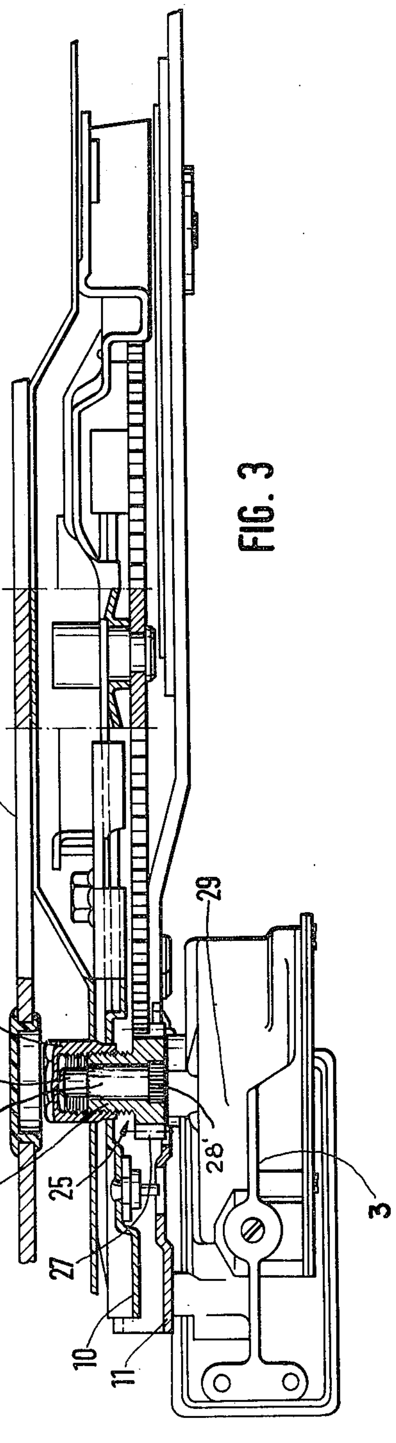
FIG. 3 is a sectional view taken along the line III—III of FIG. 2.

Referring now firstly to FIGS. 2 and 3, it will be seen that the arrangement illustrated in these Figures has a lever system including a base member comprising a mounting plate 10 and a supporting member 11 attached to the mounting plate. A gear wheel 12 is mounted on the base member 10, 11 rotatably about an axis 13. The gear wheel 12 carries a rocking lever 15, eccentrically mounted on a trunnion 14, and having a longitudinal slot 16 engaging a guide trunnion 17. The latter is supported by the base member 10, 11 and preferably is provided with a guiding element. A free end of the rocking lever 15 engages, as clearly shown in FIG. 1, a guiding strip 18 fixed to a glass panel of a window of the motor car. When the gear wheel 12 rotates, the rocking lever 15 turns about the guiding trunnion 17 and at the same time moves in the longitudinal direction. A flat spiral spring is provided for compensation of the weight of the glass panel engaged with the guiding strip 18 which spring has two opposite ends identified by reference numerals 19 and 20, respectively. The above described construction has been known in the art.

A pinion 25 meshes with the gear wheel 12, and has an elongated hub 26 and a toothed rim 27. A height of the toothed rim 27 exceeds the height of the gear wheel 12, which permits the axial displacement of the pinion 25 relative to the gear wheel 12 without disengagement of the former from the latter.

Motor means are provided comprising an electric motor 29 having self-locking reduction transmission, for instance including a gear transmission 3 having a worm and a worm gear meshing therewith, the pinion 25 is mounted on a drive shaft 28 of the motor means and is engaged with teeth 28' provided on the outer surface of the shaft 28 and meshing with corresponding teeth on the pinion for joint rotation with the drive shaft. On the other hand, the pinion 25 can be uncoupled from the drive shaft 28 by displacement of the pinion 25 towards a free end portion 30 of the drive shaft 28; however, even in the position in which the pinion 25 is uncoupled from the drive shaft 28, the pinion 25 is still in engagement with the gear wheel 12.

A threaded sleeve-shaped element 31 formed as a cover nut is turnably but axially immovably mounted on the mounting plate 10, surrounding the free end portion 30 of the drive shaft 28 and is screwed on the hub 26 of the pinion 25. By screwing the sleeve-shaped element 31 onto the hub 26 of the pinion 25, the latter moves towards the free end portion 30 of the drive shaft 28 to become uncoupled from the same which results that the pinion 25 can rotate independently on the drive shaft 28 of the motor means. The inclination of the thread of the sleeve-shaped member 31 and of the respective thread on the pinion 25 is such that a direction of rotation of the sleeve-shaped element 31 for disengaging the pinion 25 from the drive shaft 28 corresponds to the direction of rotation which is necessary for closing the glass panel of the window. When for any reasons the electric motor 29 is turned off, it is merely sufficient to rotate the sleeve-shaped element 31 onto the pinion 25 until the latter is uncoupled from the drive shaft 28 of the motor means, and thereafter to continue the rotation of the sleeve-shaped element 31 in the same direction so that the pinion 25 is rotated and closes the glass panel. Preferably, the sleeve-shaped element 31 is provided with engaging surfaces adapted to be engaged with a polygonal wrench 41 supplied with the motor car so that the sleeve-shaped element 31 can be rotated by the same.

Figure 4:
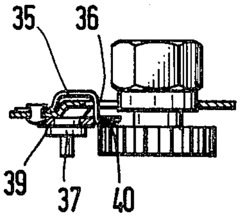
FIG. 4 is an enlarged sectional view taken along the line IV—IV of FIG. 2.

When the pinion is uncoupled from the drive shaft 28 of the motor means, the self-locking action of the reduction transmission is terminated and there is a danger that the glass panel would be displaced from the closed to open position as a result of vibration or unintensional outer force. To avoid this, the arrangement of the invention is provided, as clearly shown in FIG. 4, with a multiply-bent leaf spring 35, which loads the pinion 25 in a direction of engagement with the tooth 28' of the shaft 28. The spring 35 has a portion 36 projecting transversely to the elongation of the spring and holding a locking pawl 39 in an inoperative position. The locking pawl 39 is pivotable about a trunnion 37 and is loaded by a spring 38 in a direction of locking engagement with the pinion. When the pinion 25 is upwardly displaced by the sleeve-shaped element 31 for uncoupling the pinion 25 from the drive shaft 28 of the motor means, the leaf spring 35 is displaced above a clasp 40, so that the locking pawl 39 is released for engaging with the pinion 25. The locking pawl is so constructed and located that it acts as an overrunning lock which does not hinder the rotation of the pinion 25 in the direction for closing the glass panel of the window but at the same time reliably precludes opening of the same.

The glass panel displaced to closed position by hand operation, can be thereafter displaced to open position after releasing the locking pawl 39.

It will be understood that each of the elements described above, or two or more together, may also find a useful application in other types of constructions differing from the types described above.

While the invention has been illustrated and described as embodied in a drive arrangement for moving a glass panel of a window of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for alternately opening and closing a vehicle window, having a glass panel, the arrangement comprising displacing means connected to the glass panel for displacing the same, said displacing means including an input member which is rotatable in one direction to thereby open the window, said input member being movable between a first position and a second position; a motor coupled to said input member in the first position and uncoupled therefrom in the second position, whereby said motor rotates said input member by a motor-driven operation when said input member is in the first position to thereby displace the glass panel; a handle coupled to said input member when said input member is in the second position so as to thereby manually rotate said input member in order to displace the glass panel; and deactivable locking means connected to said input member in such a manner that said locking means are operative only until deactivated and while said input member is in the second position so as to prevent rotation of said input member in the other direction when said input member is uncoupled from said motor.

2. The arrangement defined in claim 1, said locking means being an overrunning lock provided with a locking element.

3. The arrangement defined in claim 1, said input member being a pinion having an axis, the first and second positions of the pinion being spaced from each other along the direction of the axis, and said pinion being displaceable along the direction of the axis between the first and second positions.

4. The arrangement defined in claim 3, said motor including a drive shaft, and said pinion being movably connected to the drive shaft in such a manner as to be axially displaceable relative to the drive shaft so that said pinion is coupled to the drive shaft in the first position while said pinion is uncoupled therefrom when said pinion is in the second position.

5. The arrangement defined in claim 3, said displacing means further comprising a rotatable toothed element, said pinion being axially displaceable relative to said toothed element and being in meshing engagement therewith in both positions.

6. The arrangement defined in claim 4; and further comprising disengageable holding means for said pinion in the first position, said holding means including a spring-loaded arm.

7. The arrangement defined in claim 4; and further comprising means for moving said pinion to the second position, said moving means comprising a rotatable sleeve-shaped element which is coaxial with and operatively connected to said pinion for moving said pinion to the second position as said sleeve-shaped element is rotated relative to said pinion.

8. The arrangement defined in claim 7, said pinion having a surface which includes a threaded portion, said sleeve-shaped element having a threaded section which meshes with said threaded portion of said pinion so that said pinion is axially displaced relative to and thereby uncoupled from the drive shaft of said motor due to rotation of said sleeve-shaped element.

9. The arrangement defined in claim 8, the thread of said threaded section of said sleeve-shaped element having such direction that a direction of rotation of said sleeve-shaped element for uncoupling said pinion from the drive shaft corresponds to the direction of rotation for closing the glass panel.

10. The arrangement defined in claim 6, said spring-loaded arm including a portion adapted to hold said locking element in an inoperative position.

11. The arrangement defined in claim 10, said locking element being a spring-loaded locking pawl, and said portion of said arm being engageable with said locking pawl so as to hold the same in the inoperative position.

12. The arrangement defined in claim 10, said arm being a leaf-spring.

13. The arrangement defined in claim 8, said sleeve-shaped element having a section provided with engaging surfaces which are engageable with a tool adapted to rotate said sleeve-shaped element.

14. The arrangement defined in claim 3, said displacing means further comprising a gear wheel having an axially directed height and lever means extending between said gear wheel and said glass panel for displacing the glass panel in response to rotation of said gear wheel, said pinion being in meshing engagement with said gear wheel and including an elongated hub extending along the axis of said pinion in a direction away from said motor, and a toothed rim located between the hub and said motor, the toothed rim having an axially directed height which is greater than that of said gear wheel, whereby said pinion is axially displaceable relative to said gear wheel without disengagement therefrom.

15. The arrangement defined in claim 4, said pinion having a toothed outer surface and the drive shaft having a toothed outer surface and a free end portion axially spaced from the toothed outer surface of the drive shaft, the toothed surfaces being meshed with each other when said pinion is in the first position, and said pinion being displaced to the free end portion of the drive shaft when said pinion is in said second position.

16. The arrangement defined in claim 8, said locking means comprising a clasp, a locking pawl engageable with said clasp, and a leaf spring connected at one end to said locking pawl and at another end to said pinion so as to be axially displaceable therewith, said leaf spring pressing said locking pawl into engagement with said clasp to thereby maintain said locking pawl in an inoperative locking position when said pinion is in the first position, said leaf spring disengaging said locking pawl from said clasp as said leaf in axially displaced when said pinion moves to the second position.

* * * * *